United States Patent [19]

Solberg et al.

[11] Patent Number: 5,614,722
[45] Date of Patent: Mar. 25, 1997

[54] RADIATION DETECTOR BASED ON CHARGE AMPLIFICATION IN A GASEOUS MEDIUM

[75] Inventors: Keith Solberg, Bloomington, Ind.; William K. Pitts; Kevin M. Walsh, both of Louisville, Ky.

[73] Assignee: University of Louisville Research Foundation, Inc., Louisville, Ky.

[21] Appl. No.: 551,472

[22] Filed: Nov. 1, 1995

[51] Int. Cl.$^6$ .................................................. G01T 1/85
[52] U.S. Cl. ..................................... 250/374; 250/385.1
[58] Field of Search ................................. 250/374, 385.1

[56] References Cited

U.S. PATENT DOCUMENTS 4,376,892   3/1983   Charpak et al. .

FOREIGN PATENT DOCUMENTS 5-121036   5/1993   Japan ..................................... 250/374

OTHER PUBLICATIONS

S. F. Biagi, et al., "The microdot gas avalanche chamber: an investigation of new geometries," Nucl. Instr. and Meth. A361 (1995) 72–76. no month.

A. Ocd, "Position-sensitive detector with microstrip anode for electron multiplication with gases," Nucl. Instr. and Meth. A263 (1988) 351–359. no month.

G. Charpak, et al., "The use of multiwire proportional counters to select and localize charged particles," Nucl. Instr. and Meth. 62 (1968) 262–268. no month.

M. Lemonnier, et al., "First experimental results on new microstrip three dimensional geometry," Nucl. Instr. and Meth. A349 (1994) 274–276. no month.

F. Angelini, et al., "The micro–gap chamber," Nucl. Instr. and Meth. A335 (1993) 69–77. no month.

F. Angelini, et al., "Further test and development of the micro–gap chamber," Nucl. Instr. and Meth. A349 (1994) 412–417. no month.

E. A. Babichev, et al., "High pressure multiwire proportional and gas microstrip chambers for medical radiology," Nucl. Instr. and Meth. A360 (1995) 271–276. no month.

R. Ballazzini, et al., "Electric Field, Avalanche Growth and Signal Development in Micro–Strip Gas Chambers and Micro–Gap Chambers", Rivista Del Nuovo Cimento, vol. 17, N. 12, (1994) pp. 1–91. no month.

Primary Examiner—David P. Porta
Assistant Examiner—Richard Hanig
Attorney, Agent, or Firm—Woodard, Emhardt, Naughton, Moriarty & McNett

[57] ABSTRACT

A radiation detector includes a substrate having a cavity defined therein, an anode surface positioned in the bottom of the cavity and a cathode positioned adjacent the cavity opening. A drift electrode is juxtaposed over the substrate opposite the cavity and defines a region containing a gaseous medium. As ionized charge pairs are established in the gaseous medium due to radiation provided by an external radiation source, electrons drift toward the anode under the influence of a first electric field established between the anode and drift electrode. Thereafter, the electron undergoes avalanche multiplication with the gaseous medium in an avalanche region defined by a second intense electric field established between the anode and cathode. The structure of the present invention provides an electric field gradient geometry which permits optimal design of the avalanche region geometry, and which further minimizes photon feedback from the cathode.

16 Claims, 6 Drawing Sheets

RADIATION DETECTOR BASED ON CHARGE AMPLIFICATION IN A GASEOUS MEDIUM

This invention was made with government support under the National Science Foundation grants PHY 93-14783 and OSR 94-50547. The government has certain rights in the invention.

FIELD OF THE INVENTION

The present invention relates, generally, to radiation detectors based on amplification of the charge in an ion pair produced when charged particles pass through the gas of the detector, or when a quantum of radiation interacts with the gas or material surrounding the gas. More specifically, the present invention is concerned with the use of microfabrication techniques, such as those developed by the semiconductor industry, to construct such a device, although detectors based on the principles described hereinafter may be constructed in accordance with other techniques as well.

BACKGROUND OF THE INVENTION

Gaseous radiation detectors, particularly those employed as position sensitive detectors, have been known for several decades. One early such detector in the form of a so-called MultiWire Proportional Counter (MWPC) is described by G. Charpak, et al. in an article entitled "The Use Of MultiWire Proportional Counters To Select And Localize Charged Particles", Nucl. Instr. and Meth. 62 (1968) 262. The MWPC described in the Charpak paper consisted of a number of thin anode wires assembled in a plane and mounted between two cathode plates. A potential difference was established between the anodes and the cathode plates to thereby produce an electric field sufficient for avalanche multiplication in a gas medium surrounding the wires.

As used herein, the term "avalanche multiplication" (or "avalanche amplification") refers to a succession of ionization collisions in which an electron or ion is accelerated to produce two more ions by collision. That is to say, one or more electrons in a molecule or ion can be knocked free from the molecule or ion by colliding with an electron or ion which has been accelerated in a high electric field gradient in a region where the molecule or ion is located. Additional ions created by such ionization collisions are then accelerated by the electric field to produce more ions, thus resulting in an avalanche condition.

Figure 1:
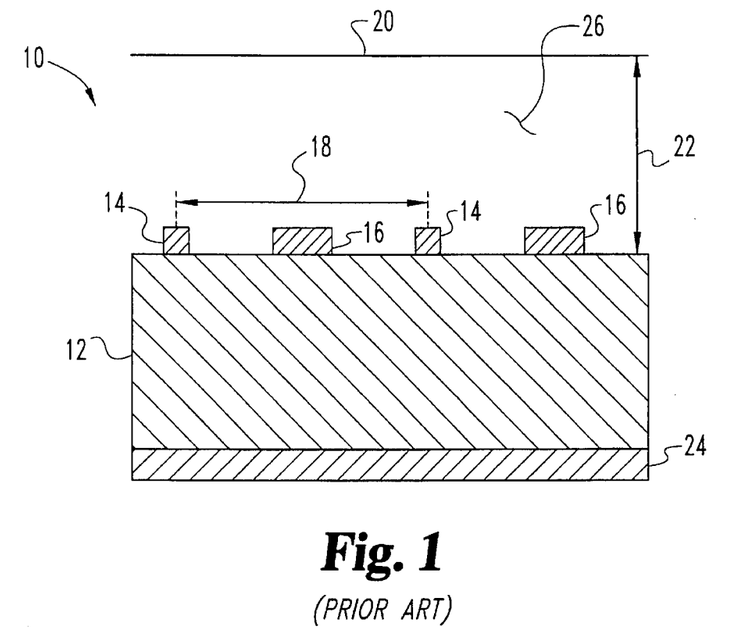
FIG. 1 is a cross-sectional illustration of a prior art Micro-Strip Gas Chamber.

In an article entitled "Position-Sensitive Detector With MicroStrip Anode For Electron Multiplication With Gases", Nucl. Instr. and Meth. A263 (1988) 351, A. Oed combined many of the MWPC concepts with known photolithography techniques to produce a so-called MicroStrip Gas Chamber (MSGC). Such an MSGC 10 is shown in FIG. 1. Referring to FIG. 1, MSGC 10 includes an electrically insulating substrate 12 upon which a series of metallic anodes 14 and cathodes 16 are patterned as is known in the semiconductor processing art. Typically, anode spacing 18 may be on the order of approximately 50–1000 micrometers. A backside conductive layer 24 is provided on the bottom side of substrate 12, the purpose of which will be discussed hereinafter.

A drift electrode 20 is spaced 22 a few millimeters (typically 3–5) above substrate 12. A gaseous medium 26 exists in the region defined by drift electrode 20 and substrate 12, and is typically comprised of a "counting gas", typically comprising a noble gas, such as Argon for example, with a "quench" gas, such as Isobutane.

In the operation of MSGC 10, a small electric field is established between drift electrode 20 and the anodes 14, and an intense electric field is established between the anodes 14 and cathodes 16. An external radiation source (not shown) initially creates charge pairs within the gaseous medium 26, and the small electric field established between drift electrode 20 and anodes 14 typically draws electrons toward the nearest anode 14 and positive charges toward the drift electrode 20. As the electrons drift sufficiently close to an anode 14, the intense electric field established between the anode 14 and cathode 16 causes the electron to undergo avalanche multiplication in a region near the anode. A resulting "cloud" of positive charges then moves toward, and is collected by, cathode 16 and electrode 20. Generally, the voltages on cathode 16 and electrode 20 are set so that only a very small percentage of the charges move toward electrode 20. The positive charges travel just above the insulating substrate 12 and can attach thereto. Backside conductive layer 24 is thus biased positively to prevent charge from accumulating on the electrically insulating substrate 12.

Figure 2:
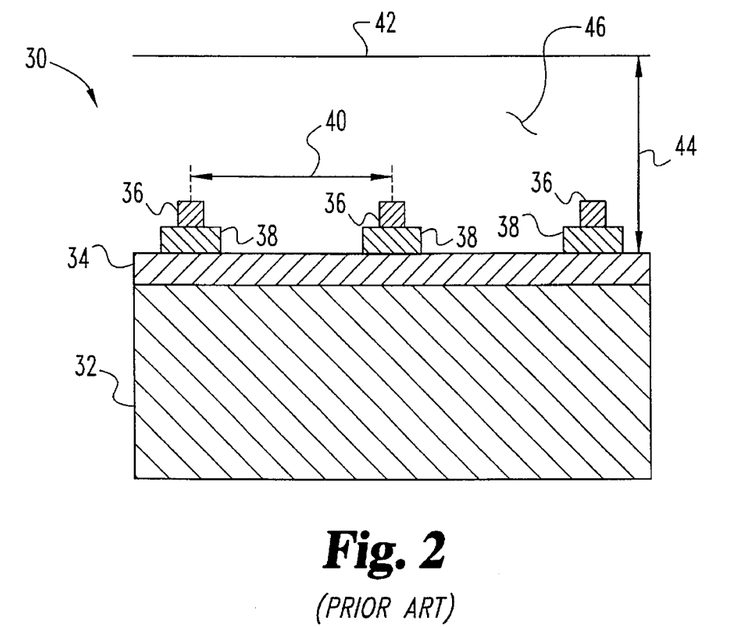
FIG. 2 is a cross-sectional illustration of a prior art Micro-Gap Chamber.

In a later article entitled "The Micro-Gap Chamber", Nucl. Instr. and Meth. A335 (1993) 69, F. Angelini et al. described improvements to the MSGC wherein the anode and cathode are separated by only a few micrometers. Such a device is known as an MGC, and an example of one such MGC 30 is shown in FIG. 2. Referring to FIG. 2, MGC 30 includes an electrically insulating substrate 32 upon which an electrically conductive cathode layer 34 is formed. A series of insulating strips 38 are then formed on cathode 34 at predetermined intervals. Upon each of the insulating strips, an electrically conductive anode strip 36 is formed so that anode strips 36 have a spacing 40 therebetween within the range of approximately 100–200 micrometers. The MGC 30 attempts to minimize charge accumulation on the substrate 32 by minimizing the amount of exposed substrate 32 and insulating strip 38 surface area. As with MSGC 10, MGC 30 includes a drift electrode 42 having a spacing 44 of a few millimeters (typically 3–5) from substrate 32. A gaseous medium is disposed between drift electrode 42 and substrate 32.

The operation of MGC 30 is very similar to that of MSGC 10, except that the electric field established between the anode 36 and cathode 34 is much more intense for comparable anode/cathode potential differences. This phenomenon is largely due to the decreased spacing between anode 36 and cathode 34, defined by the thickness of insulator 38 which is typically in the range of 2–6 micrometers.

Figure 3:
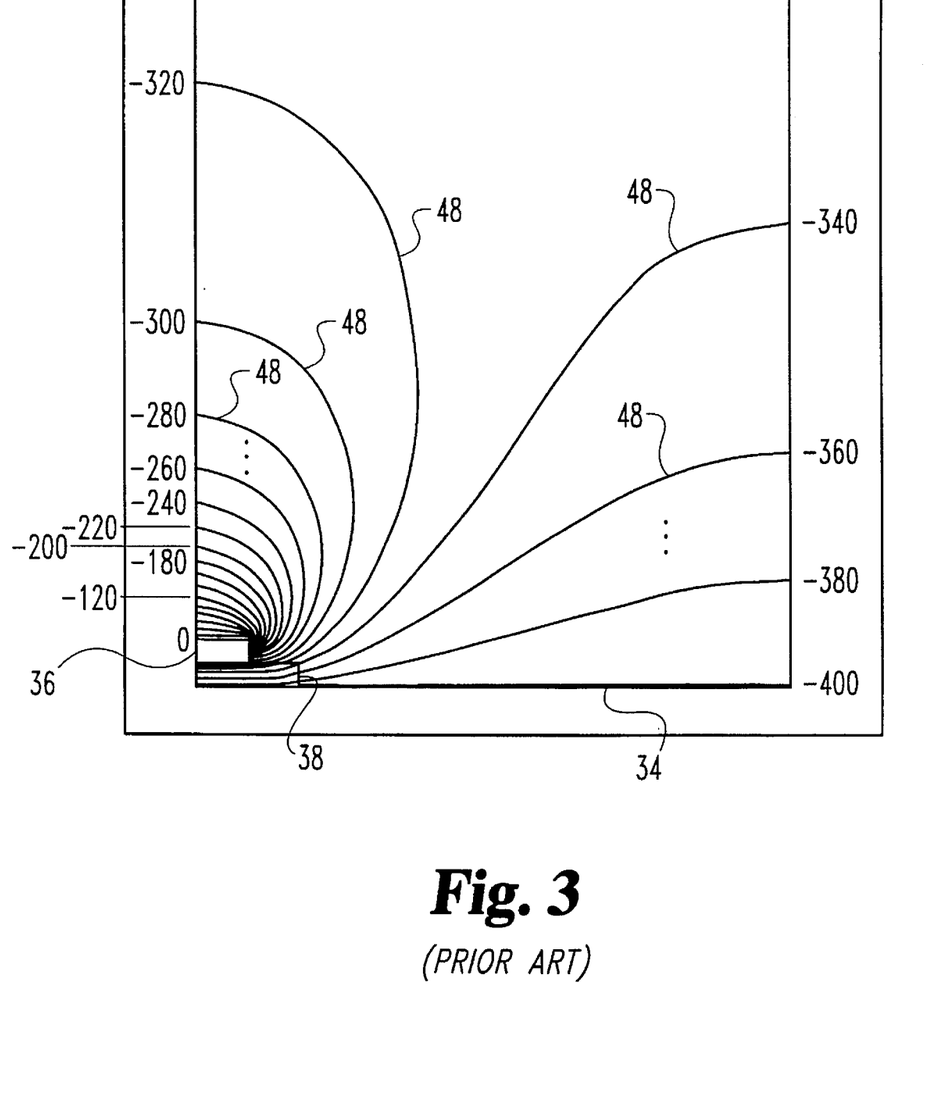
FIG. 3 is a plot of equipotential lines due to the accelerating electric field established between anode and cathode in the Micro-Gap Chamber of FIG. 2.

Although the MGC 30 has undeniably increased the electric field intensity between the anode 36 and detecting cathode 34 over that of the MSGC 10 for comparable anode/cathode potential differences (Angelini et al. reports an increase in electric field intensity by approximately a factor of 4 over an MSGC 10), both prior art devices suffer from the same inefficient design of the accelerating electric field gradient. In an avalanche ionization event, the geometry of the avalanche region is directly related to the geometry of the electric field gradient. Unfortunately, a problem common to both the MSGC 10 and MGC 30 is that the geometry of the electric field gradient used therein is not designed to permit optimal control over the geometry of the avalanche region. Referring to FIG. 3, for example, a plot of equipotential lines 48 for MGC 30 is shown in relation to cathode 34, anode 36 and insulator 38. As evidenced from FIG. 3, the equipotential lines 48 indicate that electric field lines (normal to the equipotential lines) extending between the anode 36 and cathode 34 exhibit non-parallelism over the entire avalanche region. As such, the specific geometry of the avalanche region is difficult to control.

A further drawback associated with the operation of a MSGC 10 or MGC 30 type detector is a phenomenon known as photon feedback, which is related to certain physical properties of the types of gases used therein. It is generally known that avalanche multiplication can occur in all gases. However, the choice of a particular gas, or gases, for use in a radiation detector of the type described herein is typically driven by various desirable and/or necessary operational parameters such as, for example, low working voltage, high gain operation, good proportionality, high rate capability, long lifetime and fast recovery to name a few. It is also generally known that avalanche multiplication occurs in noble gases at much lower electric fields than in complex molecules. However, during the avalanche process in a noble gas, excited and ionized atoms are formed which can only return to the ground state through a radiative emission. Thus, inherent in the avalanche ionization of a noble gas is the emission of photons.

A large fraction of the emitted light is due to the radioactive decay of the first excited state of the noble gas and, as such, has an energy above the work function of any metal that might comprise the cathode of a radiation detector. Such photons impinging upon the cathode therefore tend to extract photo-electrons therefrom which then initiate a secondary avalanche condition in the presence of the established electric field. Noble ions thus migrate to the cathode where they neutralize by extracting an electron from the cathode. The balance of energy left after extracting the electron is either radiated as a photon, or by secondary emission, i.e. extraction of another electron from the metal surface of the cathode. Photons emitted during electron-ion recombination, as well as photons emitted by the excited atoms, have sufficient energy to eject photo-electrons from the materials of the detector. These photo-electrons tend to propagate the discharge and produce spurious charge counts. To reduce this so called photon feedback effect associated with the use of noble gases, a "quench gas" is typically mixed with the noble gas, which acts to absorb charge from the ionized noble gas. The quench gas is typically a hydrocarbon gas such as isobutane, although various other gases, such as $CO_2$ or halogens, may also serve as quench gases. The use of such quench gases, however, tends to lead to deposition of undesirable residue on the electrode surfaces. Furthermore, some quench gases, such as the halogens, are highly reactive. Clearly, operation of such radiation detectors without the need for a quench gas would thus be highly desirable.

What is therefore needed is a radiation detector operable to absorb or otherwise divert the emitted photons so that the need for a quench gas can be drastically reduced or eliminated altogether. Further, if such a radiation detector could be designed such that the avalanche is confined to a dielectric boundary, then the geometry of the avalanche region could be optimized for a particular application. Such a device would more efficiently detect radiation as well as exhibit an improved signal-to-noise ratio over prior art devices.

SUMMARY OF THE INVENTION

The foregoing shortcomings of the prior art are addressed by the present invention. In accordance with one aspect of the invention, a radiation detector for providing multiplication of charges comprises an electrically conductive anode add a gaseous medium in contact with the anode, wherein the gaseous medium includes charges resulting from ionization thereof. Also included is an electrically conductive cathode disposed within the gaseous medium between the anode and the charges such that the cathode is electrically insulated from the anode. The anode and cathode define an electric field therebetween sufficient to cause avalanche ionization of the charges with the gaseous medium adjacent the anode to thereby provide multiplication of the charges.

In accordance with another aspect of the present invention, a radiation detector for providing multiplication of charges comprises a dielectric substrate having a top surface defining a cavity therein having a cavity opening extending into the substrate and terminating in an electrically conductive anode surface, an electrically conductive cathode formed on the dielectric substrate top surface adjacent the cavity opening, and a gaseous medium in contact with the cathode and extending into the cavity into contact with the anode surface, wherein the gaseous medium includes charges resulting from ionization thereof. The anode surface and the cathode define a first electric field therebetween sufficient to cause avalanche ionization of the charges with the gaseous medium adjacent the anode surface to thereby provide multiplication of the charges.

In accordance with a further aspect of the present invention, a method of forming a radiation detector for amplifying charges comprises the steps of: (1) forming a cavity into a top surface of a dielectric substrate, (2) providing an electrically conductive anode in a bottom of the cavity, (3) forming an electrically conducting cathode along the top surface of the dielectric substrate adjacent the cavity, (4) providing a gaseous medium in contact with the cathode and extending into the cavity in contact the anode, the gaseous medium including charges resulting from ionization thereof, and (5) establishing an electric field between the anode and cathode sufficient to cause avalanche ionization of the charges with the gaseous medium adjacent the anode.

One object of the present invention is to provide a radiation detector employing an accelerating field to produce avalanche ionization wherein the accelerating field geometry permits optimal control over the length and width of the avalanche region.

Another object of the present invention is to provide a radiation detector with gaseous discharge amplification employing an anode/cathode structure designed to minimize photon feedback from the cathode.

A further object of the present invention is to provide such a radiation detector device wherein the fraction of quench gas, to decrease photon feedback, may be drastically reduced or eliminated altogether.

Yet another object of the present invention is to provide a sealed charge amplification device having only a noble gas as the gaseous medium.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
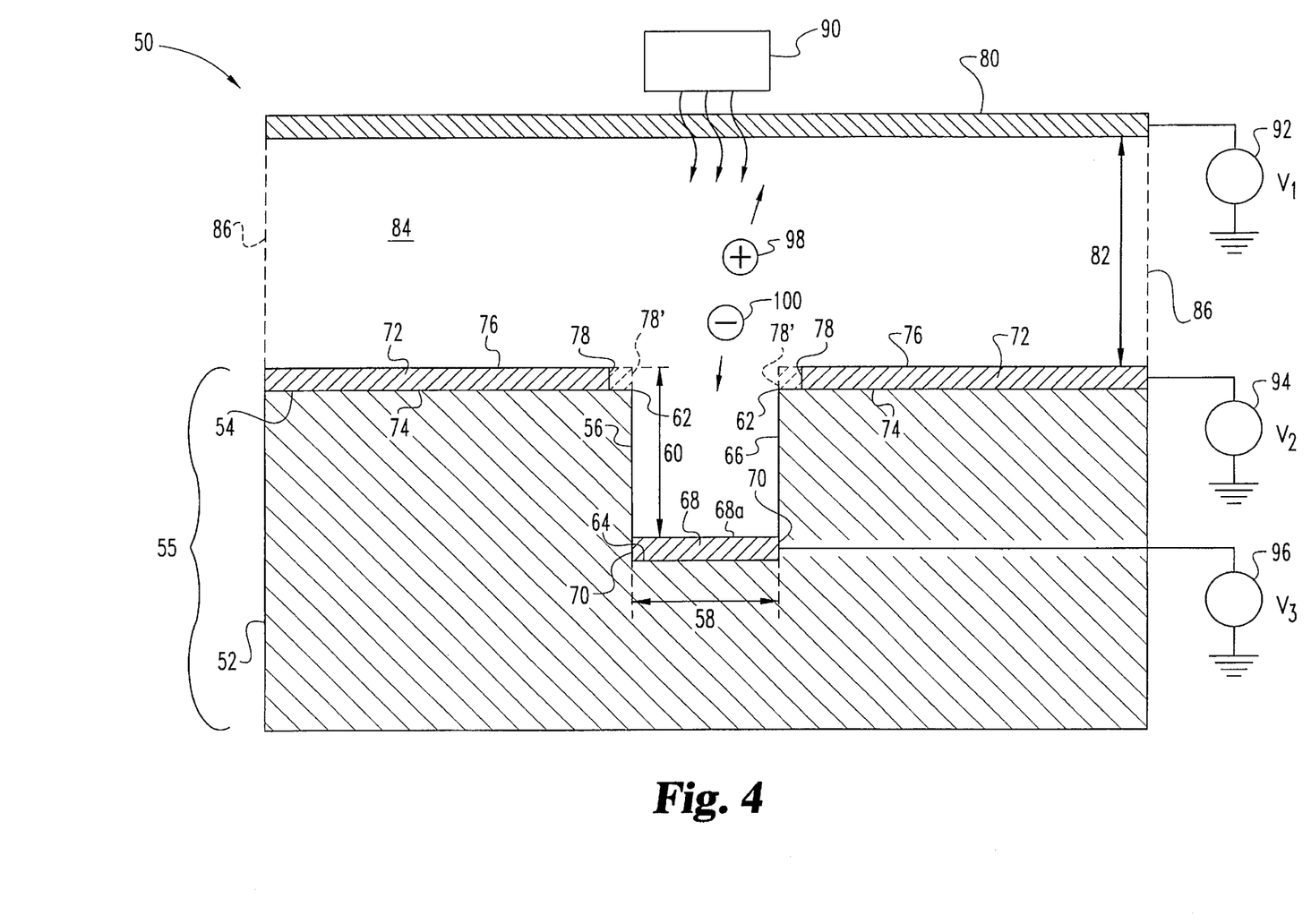
FIG. 4 is a cross-sectional illustration of a device for providing charge amplification in a gaseous medium in accordance with the present invention.

Referring to FIG. 4, a radiation detector 50, based on charge amplification in a gaseous medium in accordance with the present invention, is shown. Central to detector 50 is an electrode structure 55 which is preferably fabricated in accordance with known semiconductor processing techniques, although the present invention contemplates constructing electrode structure 55 in accordance with other techniques as will be discussed hereinafter. Electrode structure 55 includes a dielectric substrate 52 which may be formed of any known electrically insulating material and which is preferably conducive to semiconductor fabrication processes. Preferably, substrate 52 is formed of any of the commonly used semiconductor insulating materials such as, for example, silicon dioxide ($SiO_2$), silicon nitride ($Si_3N_4$), polyimide, quartz, other known glasses, polyester, and the like.

Substrate 52 includes a top surface 54 into which a cavity 56 is formed. Cavity 56 has an opening 62 which extends downwardly into the substrate 52 and terminates at a cavity bottom 64. Preferably, cavity 56 includes a substantially vertical cavity sidewall 66, although the present invention contemplates that cavity sidewall 66 may be made non-vertical in order to optimize the geometry of the avalanche region for a particular application as will be more fully discussed hereinafter. Cavity 56 may be formed by a variety of known semiconductor processing techniques such as by sawing or by laser cutting, for example, although cavity 56 is preferably formed by a known micro-machining process such as reactive etching. Cavity 56 may be provided with any desired width 58 that permits formation of the desired avalanche region geometry. In one embodiment the width 58 is in the range of a few micrometers. Similarly, cavity 56 may be provided with any desired depth 60 that permits formation of the desired avalanche region geometry. In one embodiment the depth 60 is between approximately 5–25 micrometers. Furthermore, cavity 56 may be provided in any of a variety of geometrical shapes. For example, in accordance with one embodiment of the present invention, cavity 56 is an elongated "trench," that is, a long narrow cavity 56. In an alternate embodiment, cavity 56 is a round "pit," that is, a round hole of some known diameter. It is to be understood, however, that cavity 56 may be any geometrical shape, having either rounded or unrounded corners, the importance of cavity 56 being that it has some depth with an anode disposed in the bottom thereof, a cathode adjacent its opening and a dielectric sidewall therebetween.

In the bottom 64 of cavity 56, an electrically conductive anode 68 is formed. Anode 68 has anode sidewalls 70 and an anode top surface 68a. Anode 68 is preferably formed such that anode sidewalls 70 abut cavity sidewalls 66 so that only the top surface 68a of anode 68 is exposed to the interior of cavity 56. However, the present invention contemplates that anode sidewall 70 may stop short of, or extend into, cavity wall 66. Preferably, anode 68 is formed of a metal having high electrical conductivity and having good adherence to the underlying substrate 52. A variety of such metals and metal composites are known and successfully implemented in the semiconductor industry, and in one embodiment, anode 68 is formed of tungsten or a titanium-tungsten alloy. Alternatively, anode 68 may be formed of a conductive sheet disposed in the bottom of the cavity 56. The conductive sheet may be, for example, Indium Tin Oxide, which can be 90% transparent to light. The photons in the avalanche region could then proceed through the anode to a light detection system as described in related U.S. Pat. application Ser. No. 08/551,556, entitled, OPTICAL IMAGING SYSTEM UTILIZING A CHARGE AMPLIFICATION DEVICE, filed by William Karl Pitts et al., and assigned to the assignee of the present invention. It should further be pointed out that a light transparent conductor (such as Indium Tin Oxide) may be used to form any of the anode 68 (or cathode 72) structures described herein. Finally, anode 68 may be formed of a wire inserted into a capillary tube with the top, of the capillary tube coated with a conductor at the end of the wire acting as the anode.

An electrically conductive cathode 72 is formed along the top surface 54 of substrate 52 in the area adjacent cavity 56. Cathode 72 has a cathode bottom surface 74 that forms an interface with the top surface 54 of substrate 52, an opposite top surface 76 and a thickness therebetween. Cathode 72 terminates in a cathode sidewall 78 which preferably terminates short of the cavity opening 62. In one embodiment, cathode sidewall 78 terminates approximately 1–2 micrometers short of cavity opening 62. However, the present invention contemplates that cathode sidewall 78 may terminate at greater distances from cavity opening 62, or may be extended toward cavity opening 62, and may ultimately be arranged to form cathode sidewall 78', which is coterminous with cavity sidewall 66. As with anode 68, cathode 72 is formed of a metal having high electrical conductivity and having good adherence to the underlying substrate 52, such as, for example, tungsten or a titanium-tungsten alloy.

At a distance 82 above electrode structure 55, preferably a few millimeters, a drift electrode 80 is provided. Between drift electrode 80 and electrode structure 55, a gaseous medium 84 is provided. Gaseous medium may be any number of gases capable of avalanche ionization, although preferably gaseous medium 84 comprises a noble gas with little or no quench gas added thereto. It will be recognized by those skilled in the art, however, that many different gases and gas combinations may be used as gaseous medium 84, depending upon the particular application requirements. In any event, the gaseous medium region; i.e. that defined by the area between drift electrode 80 and electrode structure 55, may optionally sealed by sidewalls 86 to provide an enclosed gas chamber. Various gases at various pressures may then be used as the gaseous medium 84.

Although not shown in the drawings, drift electrode 80 may further be provided with a radiation transmissive window to permit a radiation source 90 to irradiate the gaseous medium 84 from above the drift electrode 80. However, drift electrode is preferably constructed of a radiation transmissive material that is further electrically conductive, such as, for example, a metallic grid structure. Radiation source 90 may be any known source capable of creating ionized charge pairs within gaseous medium 84. Examples such sources include alpha-particle sources, gamma-ray sources, X-ray sources, photon sources, neutron sources, and charged particle sources to name a few.

Detector 50 further includes means to create at least two ion accelerating fields: one between anode 68 and drift electrode 80, and one between anode 68 and cathode 72. Although the present invention contemplates utilizing any known means for establishing such ion accelerating fields, the present invention preferably uses a voltage source $V_1$ 92 connected to drift electrode 80, voltage source $V_2$ 94, connected to cathode 72 and voltage source $V_3$ 96 connected to anode 68. The foregoing voltage sources are used to establish a first electric field between anode 68 and drift electrode 80, and a second electric field between anode 68 and cathode 72. As an example of one embodiment, the various voltage sources are adjusted to provide a voltage differential between anode 68 and drift electrode 80 of approximately 500 volts, and a voltage differential between anode 68 and cathode 72 of 400 volts.

The operation of detector 50 for providing charge amplification in a gaseous medium will now be described in detail. The basic operation of detector 50 as a charge amplification system is essentially the same as that described with previously with reference to FIGS. 1 and 2. With reference to FIG. 4, radiation source 90 is operable to create charge pairs 98 and 100 within the gaseous medium 84. The electric field established between anode 68 and drift electrode 80 via voltage sources $V_3$ 96 and $V_1$ 92 respectively, causes pairs 98 and. 100 to separate and drift toward an appropriate electrode. Preferably, the electric field established between anode 68 and drift electrode 80 is oriented such that positive charge 98 drifts toward drift electrode 80 and electron 100 drifts toward anode 68. However, the present invention contemplates that the electric field established between anode 68 and drift electrode 80 may be oppositely oriented such that positive charge 98 drifts toward anode 68.

A second, and much more intense, electric field is established between anode 68 and and cathode 72 via voltage sources $V_3$ 96 and $V_2$ 94 respectively. The purpose of this second electric field is to accelerate charges drifting toward anode 68 into avalanche ionization within the gaseous medium 84, to thereby provide a charge multiplication, or amplification, of which the positive charge is collected by cathode 72 and the negative charge is collected by anode 68. If the charges drifting toward anode 68 are electrons, then this second electric field is oriented to accelerate such electrons toward anode 68. If, however, the second electric field is reversed, then element 68 becomes the cathode and the second electric field is operable to accelerate the positive charges toward the cathode 68.

The anode/cathode geometrical relationship shown in FIG. 4 and forming a part of the present invention provides at least three advantages over prior art anode/cathode arrangements. First, a more uniform and efficient electric field may be established between anode 68 and cathode 72 when anode 68 is designed so that the electric field lines emanate from the top surface 68a thereof, rather than from a corner as in prior art designs. Such a restructuring of the electric field geometry provides a more robust electric field. The rapid variation in the electric field gradient around the anode edges in prior art designs can be minimized or eliminated by utilizing the concepts of the present invention so that more uniform electric field gradients, leading to more evenly distributed higher intensity fields, may therefore be attained.

Secondly, as a result of the anode/cathode relationship design of the present invention, the avalanche region, typically located just above the surface of the anode 68, can be designed to have a desired length and width, simply by modulating the width 58 and depth 60 of cavity 56. Such control over the geometry of the avalanche region permits the avalanche region to be optimized in length and width for various radiation detector applications. The design of the avalanche region geometry for electrode structure 55 will now be discussed with reference to FIGS. 4 and 5.

Figure 5:
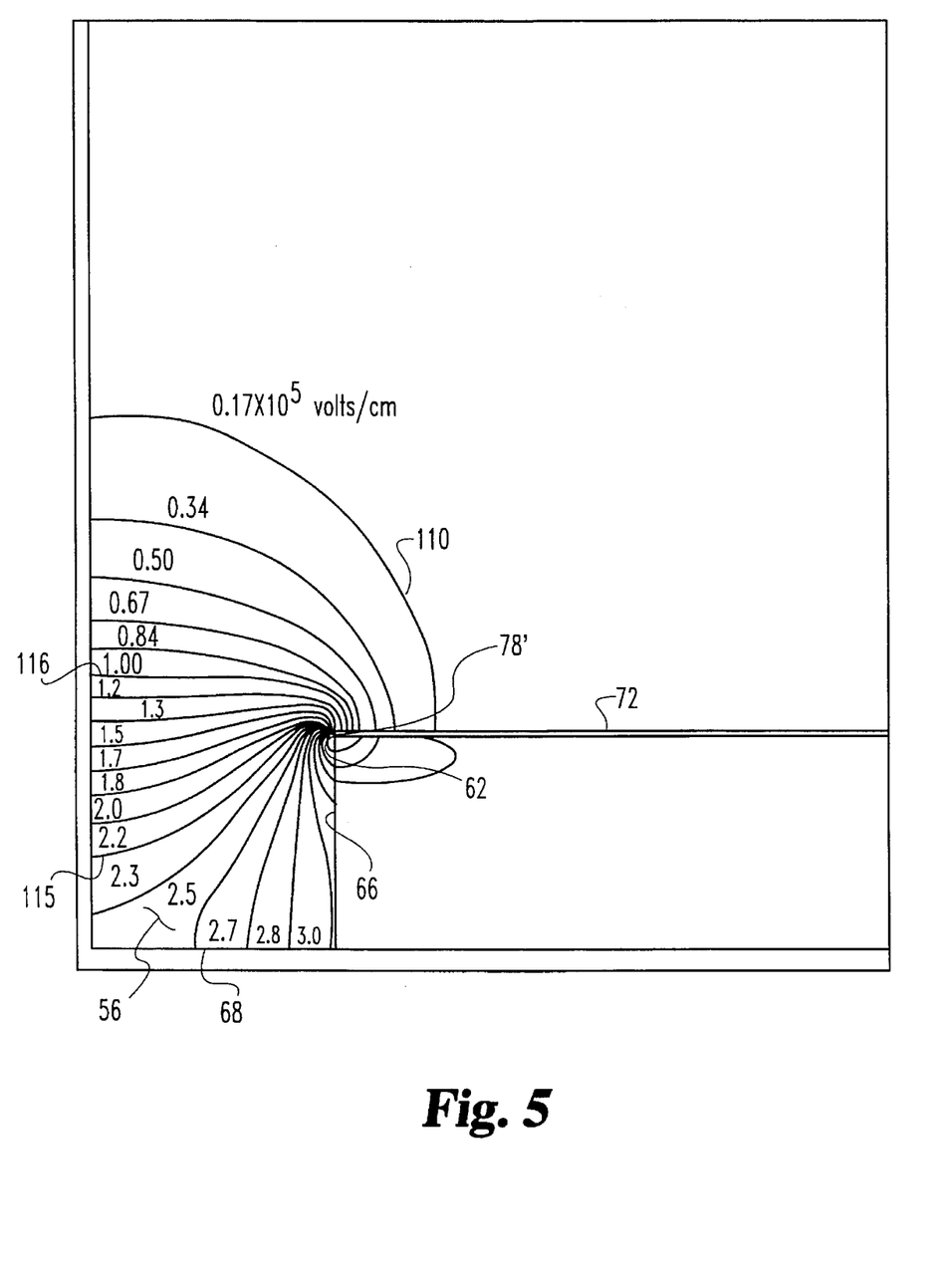
FIG. 5 is a plot of the magnitude of the electric field established between the anode and cathode of the device of FIG. 4.

FIG. 5 shows a contour plot of the electric field magnitude for the electrode structure 55 of FIG. 4, wherein cathode sidewall 78 is coterminous with cavity sidewall 66. It is generally understood by those skilled in the art that avalanche begins approximately where the electric field magnitude reaches about 100,000 volts/cm. The plot of FIG. 5 shows that for the anode 68 and cathode 72 voltages chosen, and for the dimensions of cavity 56, the avalanche begins within the cavity 56. If the cavity 56 is formed with a smaller width 58, the contour 110, which represents 100,000 volts/cm, will be raised higher above cavity opening 62. Similarly, if the width 58 is decreased, the contour 110 will be lowered toward cavity opening 62. In similar fashion, if the height 60 of cavity 56 is increased, the contour 110 will be correspondingly raised, and if the height 60 is decreased, the contour 110 will be correspondingly lowered. Thus, by controlling the width 58 and height 60 of cavity 56, together with the voltages of sources 94 and 96, the geometry of the avalanche region can be controlled. In particular, the geometry of the avalanche region can be controlled so that it only occurs within the confines of the cavity 56. It should be noted that, if it is found that the contour corresponding to approximately 280,000 volts/cm cause the avalanche region to assume some undesired characteristic, the cavity sidewall may be adjusted to a non-vertical orientation to minimize the undesired effect. The prior art devices described herein have insufficient flexibility to control the avalanche region in the foregoing manner.

Figure 6:
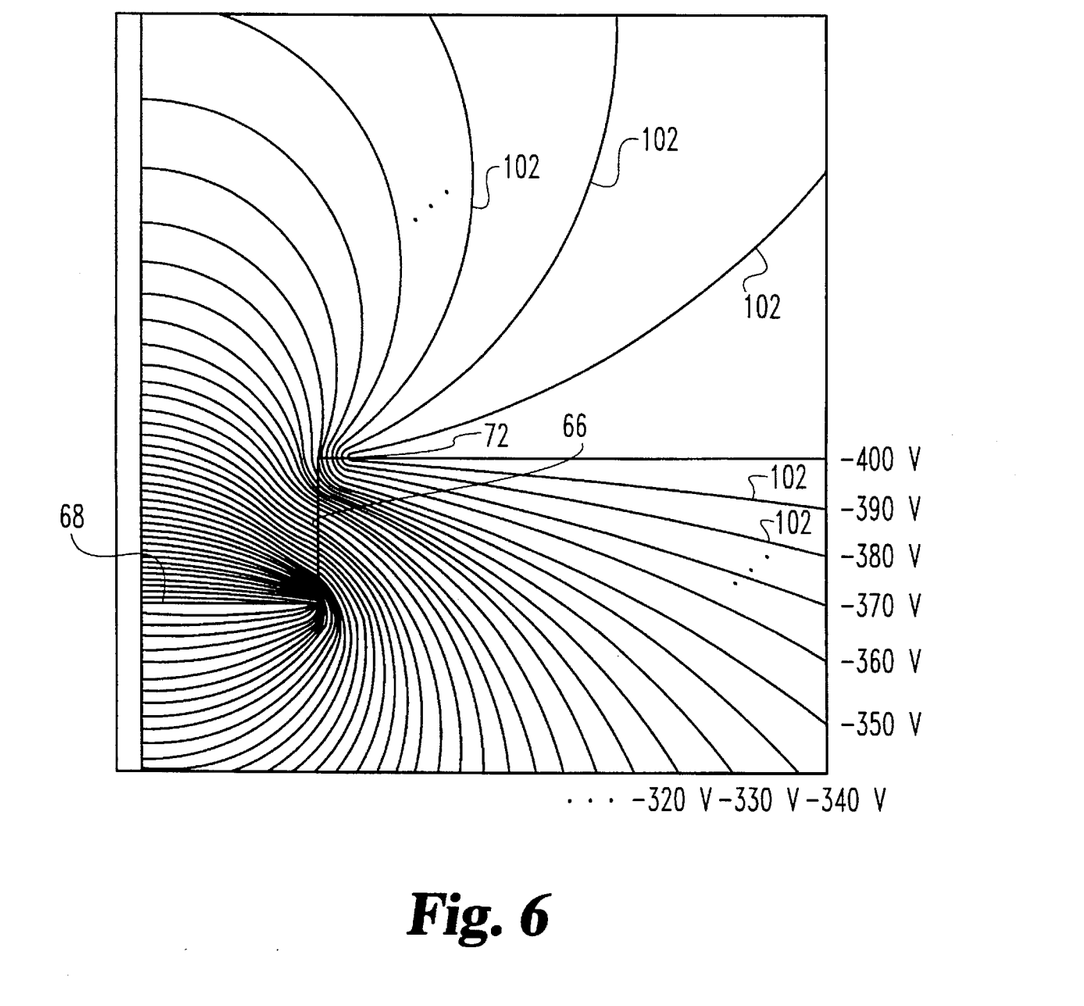
FIG. 6 is a plot of equipotential lines due to the electric field established between anode and cathode in the device of FIG. 4.
Figure 7:
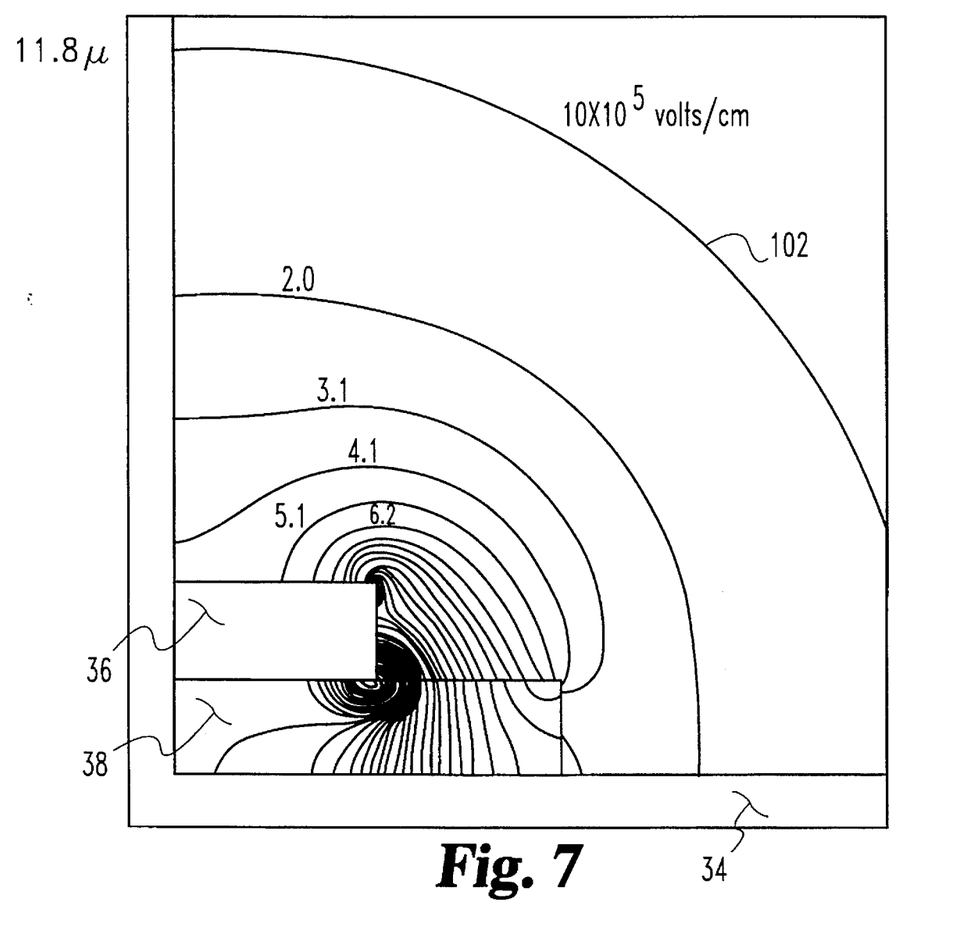
FIG. 7 is a plot of the magnitude of the electric field established between the anode and cathode of the device of FIG. 2.

Finally, the anode/cathode relationship design of the present invention ensures that the electric field gradient lines are nearly parallel to each other throughout the region of interest (the avalanche region). Referring to FIG. 6, a plot of equipotential lines in relation to anode 68 and cathode 72 is shown, wherein cathode sidewall 78 terminates short of cavity sidewall 66. The design of anode 68 and cathode 72 causes the electric field geometry established therebetween to be generally normal to anode surface 68 and directed toward the surface of cathode sidewall 78 (electric field is normal to equipotential lines). By contrast, FIG. 7 shows a contour plot of the magnitude of the electric field lines for the device 30 of FIG. 2. As previously described, avalanche is generally understood to begin at about 100,000 volts/cm. The 100,000 volts/cm contour 120 is approximately 12 micrometers above the anode 36. The plot shows that the region contains contours as high as 620,000 volts/cm and restricted regions as high as 1,000,000 volts/cm. Furthermore, not all electrons will traverse the same electric field gradients. Referring back to the plot of FIG. 5, the voltages of sources 94 and 96 can be adjusted so that the contour 116 with 100,000 volts/cm can be adjusted so that it is positioned where the 220,000 volts/cm contour 115 is located. When this adjustment is made, avalanche will begin in the middle of cavity 56 at approximately the same height as for device 30 as shown in FIG. 7, namely, 12 micrometers. However, the maximum electric field intensity which any electron will be subjected to in the avalanche geometry of FIG. 5 is approximately 140,000 volts/cm (as compared to 1,000,000 volts/cm for device 30 as shown in FIG. 7). The small variation in the electric field intensity for the electrode structure 55 of FIG. 4 is a direct consequence of a design which produces electric field lines mostly parallel with the cavity sidewall 66. Such a small variation in electric field intensity leads to a more uniform avalanche, and should lead to smaller gain variations and, possibly, higher gains.

In addition to the improved electric field geometry, the anode/cathode configuration of electrode structure 55 has the benefit of reduced susceptibility to photon feedback. Owing to the cavity structure of electrode structure 55, the photon feedback phenomenon is greatly reduced in the operation thereof. As seen with reference to FIGS. 4 and 5, photons emitted from the avalanche region within the cavity 56 are predominately transmitted through the cavity sidewall 66 of dielectric substrate 52 to the bottom side 74 of cathode 72. The structure of cavity 56, and positioning of the anode 68 and cathode 72, insures that only a small percentage of such photons will reach the cathode outer surface (primarily cathode sidewall 78). Thus, the majority of photo-electrons emitted from cathode 72 (i.e. those emitted from bottom surface 74) are inhibited from drifting to cavity 56 due to the low mobility of ions within dielectric substrate 52, so that most of such photo-electrons never reach the avalanche region proximate to anode surface 68a. In fact, only a very small percentage of such photo-electrons, namely those emitted from sidewall 78, have a chance of reaching the avalanche region. Thus, photon feedback in electrode structure 55 is greatly reduced, if not eliminated altogether. Such a reduction in photon feedback permits a corresponding reduction in, or possible elimination of, the fraction of quench gas required in the gaseous medium 84. Thus, detector 50 may be sealed and filled only with a noble gas. Heretofore, the operation of such a charge amplification system with strictly a noble gas medium has been achieved, but at greatly reduced gain, particularly when using the lighter noble gases.

Finally, it is known that an increase in the avalanche electric field established between the anode and cathode results in extending the avalanche region closer to the cathode. This extension of the avalanche region toward the cathode effectively increases the photon feedback effect which therefore limits the intensity of the avalanche electric field that can be utilized in prior art systems. With the drastic reduction in the photon feedback effect in device 55, the avalanche electric field established between anode 68 and cathode 72 may be correspondingly increased to thereby provide larger amplification gains.

Applications of detector 50 in general, and of electrode structure 55 specifically, include those appropriate to any radiation detector, e.g. nuclear monitoring applications, neutron and X-ray imaging, and medical physics applications. Some of these applications are discussed in greater detail in related U.S. Pat. application Ser. No. 08/551,556, entitled, OPTICAL IMAGING SYSTEM UTILIZING A CHARGE AMPLIFICATION DEVICE, filed by Karl Pitts et al., and assigned to the assignee of the present invention.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, the electrode structure 55 described herein may also be used to operate a radiation detector wherein the gaseous medium 84 is replaced with a liquid such as, for example, liquid argon or liquid xenon. In such an application, it may be desirable to render at least a portion of the dielectric substrate 52, near the cavity opening 62, conductive. This may be accomplished, for example, by disposing conductive particles within the appropriate areas of the substrate 52. Furthermore, in such an application, it may be desirable to coat the cathode 72 with a material having a higher work function than traditional cathode materials. This may also have the effect of permitting a reduction in the quantity of quench gas used in gaseous applications. It should be noted that the foregoing modifications of rendering at least a portion of the dielectric substrate 52 conductive and coating the cathode 72 with a material having a high work function may also be made to a radiation detector having a gaseous medium 84 to thereby optimize the operation thereof.

As a second example, it has been noted herein that the present invention contemplates techniques other than micromachining and other known semiconductor fabrication techniques for constructing an electrode structure 55 of the type forming a part of the present invention. One such technique may involve either laser cutting or micromachining structure 55 from a metal clad insulating film, such as a copper clad Kapton® polyimide dielectric film. Essentially, the Kapton® dielectric film is sandwiched between copper affixed thereto so that a cavity may be formed from the top surface thereof to the lower layer of copper.

Another technique for constructing an electrode structure 55 involves providing a capillary tube and a wire having the same inner diameter. The tube is cut so that the cut surface is perpendicular to the axis of the inner hole, after which the cut surface is provided with a conductive surface such as by plating, spraying or painting. The conductive surface of the cut tube acts as the cathode. The wire, acting as the anode, is inserted into the inner hole from the opposite end of the tube where the cut was made, and advanced to a desired depth below the cut surface.

Yet another technique for constructing an electrode structure 55 involves using a capillary tube as previously described, but advancing a metalized member therein to form the anode. If, for example, MYLAR® polyester film coated with Indium Tin Oxide is used as the anode material, light from the avalanche can effectively be extracted from the cavity since this coating is approximately 80% light transmissive.

Still another technique for constructing an electrode structure 55 involves boring a cavity into a metalized member, such as aluminized MYLAR® polyester film to a desired cavity depth.

What is claimed is:

1. A radiation detector for providing multiplication of charges comprising:

a dielectric substrate defining a cavity opening therein extending into said substrate and terminating in a cavity bottom;

an electrically conductive anode disposed on said cavity bottom, said anode having a substantially flat top surface facing said cavity opening;

an electrically conductive cathode formed adjacent said cavity opening; and a gaseous medium in contact with said cathode and extending into said cavity in contact with said anode, said gaseous medium including charges resulting from ionization thereof;

wherein said anode and said cathode define an electric field therebetween sufficient to cause avalanche ionization of the charges with said gaseous medium adjacent said top surface of said anode to thereby provide multiplication of the charges.

2. The radiation detector of claim 1 wherein said cathode is formed on a top surface of said dielectric substrate, said cathode terminating adjacent said cavity opening.

3. The radiation detector of claim 2 wherein said cavity is further defined by a cavity wall extending from said cavity opening to said cavity bottom;

and wherein said anode includes a bottom surface in contact with said cavity bottom, an opposite top surface and an anode thickness therebetween, said anode thickness terminating in a sidewall surface of said anode abutting said cavity wall such that only said top surface of said anode is exposed to said cavity opening.

4. The radiation detector of claim 3 wherein said cathode includes a bottom surface forming an interface with said top surface of said dielectric substrate, an opposite top surface and a cathode thickness therebetween, said cathode thickness terminating in a sidewall surface of said cathode adjacent said cavity opening.

5. The radiation detector of claim 4 wherein said cavity opening and said cavity bottom define an axis therebetween;

and wherein said cavity wall is substantially parallel with said axis.

6. The radiation detector of claim 4 wherein said electric field is established by applying a first potential to said cathode and a second greater potential to said anode such that said electric field extends from said top surface of said anode in a direction parallel to said axis.

7. A radiation detector for providing multiplication of charges comprising:

a dielectric substrate having a top surface defining a cavity therein having a cavity opening extending into said substrate and terminating in an electrically conductive anode surface;

an electrically conductive cathode formed on said dielectric substrate top surface and terminating adjacent said cavity opening;

a drift electrode overlaying said substrate and defining a space therebetween; and a gaseous medium in said space and extending into said cavity into contact with said anode surface, said gaseous medium including charges resulting from ionization thereof;

wherein said anode and said drift electrode define a first electric field therebetween sufficient to cause charges of one polarity to drift toward said anode surface, and wherein said anode and said cathode define a second electric field therebetween sufficient to cause avalanche ionization of the charges with said gaseous medium adjacent said anode surface to thereby provide multiplication of the charges.

8. The radiation detector of claim 7 wherein said cathode has a bottom surface forming an interface with said top surface of said dielectric substrate, an opposite top surface and a thickness therebetween terminating in a cathode sidewall surface adjacent said cavity opening;

and wherein the position of said cathode sidewall surface relative to said anode surface minimizes photon feedback to said anode surface during said avalanche ionization.

9. The radiation detector of claim 8 wherein said gaseous medium includes a noble gas.

10. The radiation detector of claim 7 further including a drift electrode juxtaposed with said dielectric substrate opposite said cathode and defining a gas region therebetween containing said gaseous medium.

11. The radiation detector of claim 10 further including a source of radiation operable to ionize molecules within said gaseous medium to provide charge pairs.

12. The radiation detector of claim 11 wherein said anode surface and said drift electrode define a second electric field therebetween sufficient to cause said charge pairs to separate such that positive charges drift toward said drift electrode and electrons drift toward said anode surface.

13. The radiation detector of claim 12 wherein said drift electrode defines a radiation transmissive window therein to permit radiation from said source of radiation to pass therethrough into said gaseous medium.

14. A method of forming a radiation detector for amplifying charges, the method comprising the steps of:

(1) forming a cavity into a top surface of a dielectric substrate;

(2) providing an electrically conductive anode having a substantially flat anode surface in a bottom of the cavity;

(3) forming an electrically conductive cathode along the top surface of the dielectric substrate adjacent the cavity;

(4) providing a gaseous medium in contact with the cathode and extending into the cavity in contact with the anode surface, the gaseous medium including charges resulting from ionization thereof; and (5) establishing a first electric field between the anode and cathode sufficient to cause avalanche ionization of the charges with the gaseous medium adjacent the anode surface.

15. The method of claim 14 wherein the cavity is formed by micro-machining the dielectric substrate.

16. The method of claim 14 further including the steps of:

(6) providing a drift electrode overlaying the substrate and defining a space therebetween; and (7) establishing a second electric field between the anode and drift electrode sufficient to cause charges of one polarity to drift toward the anode surface;

wherein the gaseous medium is further provided in the space between the drift electrode and the substrate.

\* \* \* \* \*

UNITED STATES PATENT AND TRADEMARK OFFICE
CERTIFICATE OF CORRECTION

PATENT NO. : 5,614,722

DATED : March 25, 1997

INVENTOR(S) : Keith Solberg et al.

It is certified that error appears in the above-identified patent and that said Letters Patent is hereby corrected as shown below:

In col. 4, line 2, please change "add" to --and--.

In col. 4, line 29, please change "a-top" to --a top--.

In col. 6, line 34, please delete the comma.

In col. 7, line 38, please delete the period.

Signed and Sealed this

Fifth Day of August, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,614,722
DATED : March 25, 1997
INVENTOR(S) : Keith Solberg, et al.

It is certified that error appears in the above-indentified patent and that said Letters Patent is hereby corrected as shown below:

On the title page under "Assignee", item [73] should read:

-- University of Louisville Research Foundation, Inc., Louisville, KY, and Indiana University Foundation, Indianapolis, IN.--

Signed and Sealed this

Tenth Day of August, 1999

Attest:

Q. TODD DICKINSON

*Attesting Officer*    Acting Commissioner of Patents and Trademarks